Dec. 26, 1967    H. A. MERGES ETAL    3,360,204
ROTARY CUTTER FOR BULK MATERIALS
Filed Oct. 13, 1964
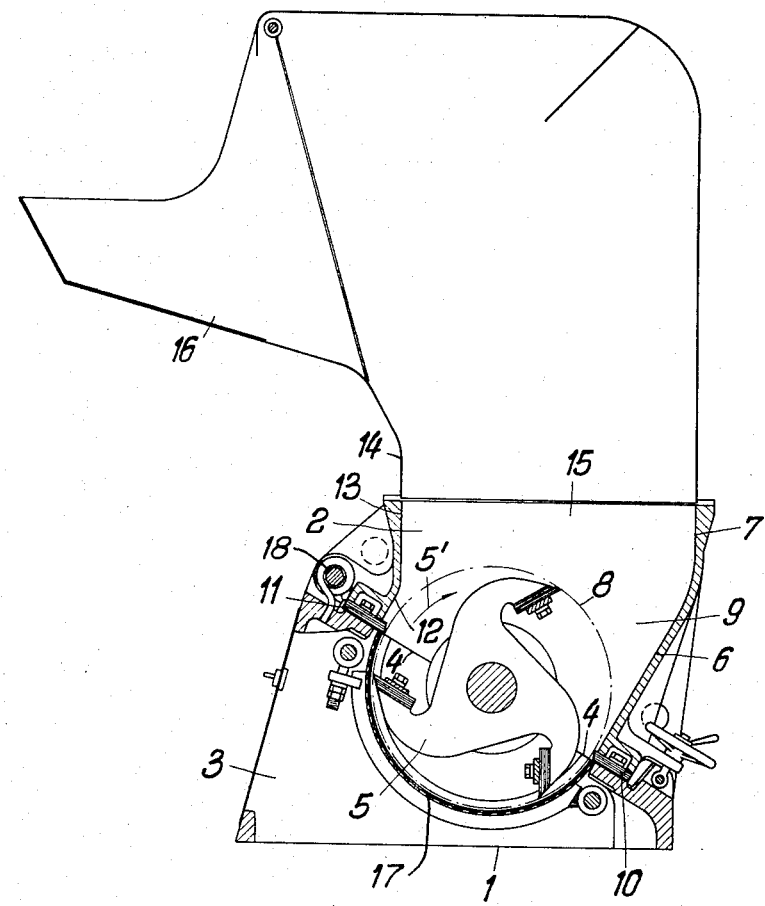
Inventors
HERBERT ALFRED MERGES
HANS GEORG KERSTIN
By
    agent 3,360,204
ROTARY CUTTER FOR BULK MATERIALS
Herbert Alfred Merges, 1 Werkstr., 6451 Wolfgang, Germany, Hans Georg Krestin, 3 Feldstrasse, Ostheim, Germany, and Karl Hofmann, 59 Gartenstr., 6369 Heldenbergen, Germany
Filed Oct. 13, 1964, Ser. No. 403,595
Claims priority, application Germany, Oct. 17, 1963, C 31,172
3 Claims. (Cl. 241—73)

The present invention relates to rotary cutters for bulk materials such as thermoplastic synthetic resin scrap. More specifically, this invention is directed to the particular configuration of the cutter housing adjacent the feed inlet.

In rotary cutters of the type under discussion a rotor is mounted inside a housing on a horizontal shaft for rotation therewith. Above the rotor along its entire length a feed hopper or inlet is provided through which the material to be cut enters the cutting zone. The rotor has cutting edges which in operation move past stationary cutting elements in the housing. Beneath the feed inlet a screen is provided which extends also along the entire length of the rotor. In rotary cutters of conventional design the inlet opening is narrower than that portion of the housing in which the rotor rotates so that bulk material must first be reduced to a suitable size as by cutting or sawing, before it can enter the rotary cutter.

In the past, attempts have been made to eliminate this problem by employing oversized mills or cutters or by providing feed passages having the shape of inverted cones.

All these suggestions have the disadvantage that either the material must first be cut to a suitable size, prior to entering the mill, or the mill or cutter must be made oversize, or special means have to be provided to remove larger pieces that may have become jammed in the feed inlet opening.

It is accordingly a primary object of this invention to provide a rotary cutter which has a relatively small rotor and can accept bulk materials of thermoplastic synthetic resin as buckets, pails, bowls, tubs, baskets, cans, jugs, bottles, or the like for reduction in size, without there being any possibility for the material to become jammed in the feed inlet opening of the rotary cutter.

A further object of the invention is to provide a cutter housing in which the smallest part of inlet opening is at least as large as the diameter of the cutting-circle defined by the rotor or rotary cutter.

A further object of the invention is to arrange the feed inlet opening in such a manner that at least one-half of the rotor extends into the feed channel.

Yet another object of the invention is to provide a two-part rotor casing, with the parting line extending through the axis of the rotor.

Finally, it is an object of the invention to provide a cutter housing that can be swung open to facilitate cleaning and permit easy replacement of the cutting and screen elements.

With these objects in view, the invention, in one of its aspects, resides in a mill whose stationary casing defines a downwardly directed channel, and has respective pairs of opposite spaced walls in an upper portion and in a lower portion of the channel. The pairs of walls are angularly offset relative to each other, and the spacing of the walls in the upper channel portion is greater than of the walls in the lower channel portion. A rotary cutter is mounted in the channel for rotation about a horizontal axis which is approximately centered between the walls of the lower channel portion, and extends into the upper portion during its rotation. A stationary cutting element is mounted on one of the walls of the lower channel portion for cutting cooperation with the rotary cutter. The last mentioned wall and the rotary cutter define a cutting space which tapers in the direction of cutter rotation from the upper channel toward the stationary cutting element.

Further features and advantages of the invention will become apparent from the following detailed description with reference to the sole figure of the drawing which is a cross-sectional view of an embodiment of the invention.

In the drawing, all parts such as motor, supporting frame, exhaust system, etc. which are known per se and are immaterial to an understanding of the invention have been omitted. At 1, there is shown the horizontal supporting surface of the mill. The casing comprises two portions 2 and 3, which engage each other substantially along a plane 4 inclined at an angle of approximately 35 to 40 degrees relative to the surface 1 when they are in the illustrated operative position. They can be swung apart on hinges 18. The direction of rotation of rotary cutter 5 is indicated by an arrow 5'. That wall of the upper casing portion 2 which is located in the working direction of rotor 5, has two angularly offset flat sections 6 and 7, wall section 6 extending at a right angle to the inclined plane 4, while the wall section 7 is perpendicular to the horizontal supporting surface 1. A wedge-shaped cutting zone 9 is defined by a part of the cutting circle 8 of the rotary cutter 5 and by the wall section 6. A stationary cutting element 10 is provided at the lower end of the cutting zone 9. Another stationary cutting element 11 is disposed diametrically opposite the element 10 at the other side of the axis of the cutter 5 between the upper and lower portions of the cutter casing, the cutting element 11 being secured to the lower casing portion 3. Adjacent to the stationary cutting element 11, flat wall section 12 of the upper casing portion 2 extends at a right angle to the plane 4, and is angularly offset from a wall section 13 which is perpendicular to the horizontal supporting surface 1, the bend interconnecting the wall sections 12 and 13 being approximately on the same level as the bend interconnecting the wall sections 6 and 7 so that the wall sections form two pairs of opposite, spaced, parallel, flat wall sections. The spacing of the wall sections 7, 13 is greater than that of the sections 6, 12, and the latter is greater than the diameter of the circle 8.

To insure trouble-free operation of the rotary cutter it is imperative that the bends connecting the paired wall sections 6 and 12 to the other paired section 7 and 13 be located adjacent cutting circle 8. The material to be cut is dropped from a feed hopper 16 through a channel 14 into a feed receiving zone 15 between the wall sections 7, 13. The upper half of the rotor 5 is exposed in the zone 15 so that the rotor can act as a preliminary cutter in this zone to crush the material to suitable pieces which then enter the wedge-shaped cutting zone 9 where they are cut to the desired size by the coaction of the rotor blades with the stationary cutting element 10 and drop through a screen 17 which extends between the elements 10, 11 and downwardly bounds the channel through the casing 2, 3.

Because the wall section 12 extends at right angle to the plane 4, the rotary cutter 5 returns any insufficiently ground material to cutting zone 9 in a direction that extends away from the feed hopper or inlet so that they will not clog or obstruct the feed channel 14. It is, of course, understood that the material to be cut must fit through the feed channel and the zone 15. In the arrangement of the invention, a preliminary cutting zone is established by the rotary cutter extending into the feeding zone 15 of the channel passing through the stationary downwardly directed casing 2, 3, and the oversize is returned in a direction that extends away from the feed hopper.

While the novel features of the invention as applied to one embodiment have been shown and described, it will be obvious that the principles of the invention can be also applied to other types of mills or rotary cutters of the above-mentioned kind.

What is claimed and desired to secure by Letters Patent is:

1. In a cutting mill, the combination of a housing consisting of complemental upper and lower housing members separably connected together along a plane of abutment, the upper housing member defining a downwardly directed channel therein and having respective pairs of opposite spaced walls in an upper portion and in a lower portion of said channel, said pairs of walls being angularly offset relative to each other and the spacing of said walls in the upper channel portion being greater than in the lower channel portion, a rotary cutter journalled in said housing for rotation in a predetermined direction about a horizontal axis lying substantially in said plane of abutment of said housing members with at least one diametric half of the cutter disposed in said channel of the upper housing member, said walls in the lower channel portion being disposed at opposite sides of the cutter axis perpendicularly to said plane of abutment and being spaced apart by a distance at least as great as the effective diameter of said cutter, the entire diametric half of the cutter in said channel of the upper housing member being exposed to access by material to be cut inserted in the channel, and a stationary cutting element mounted on one of said walls of the lower channel portion for cutting cooperation with said rotary cutter, said one wall and said rotary cutter defining a cutting space tapering in said direction of rotation from said upper channel portion toward said stationary cutting element.

2. The mill as defined in claim 1 wherein said walls of each pair are substantially flat and parallel to each other.

3. The mill as defined in claim 1 together with a second stationary cutting element mounted on the other wall of the lower channel portion for cutting cooperation with said rotary cutter, said first mentioned and second mentioned stationary cutting elements being substantially coplanar with said plane of abutment to which said walls of the lower channel portion are perpendicular as aforesaid, said walls of the upper channel portion each defining with said plane of abutment an angle of approximately thirty-five to forty degrees, and screening means extending between said stationary cutting elements around the lower diametric half of said rotary cutter.

References Cited
UNITED STATES PATENTS

| | | | |
|---|---|---|---|
| 699,762 | 5/1902 | McDonald | 241—285 |
| 2,326,682 | 8/1943 | Roddy | 241—73 |
| 2,665,851 | 1/1954 | Strehlow | 241—73 |
| 2,830,770 | 4/1958 | De Luca | 241—73 |

ROBERT C. RIORDON, *Primary Examiner.*

D. G. KELLY, *Assistant Examiner.*